United States Patent [19]

Inacio et al.

[11] Patent Number: 4,917,797
[45] Date of Patent: Apr. 17, 1990

[54] APPARATUS FOR EXCHANGING IONS, MOLECULES, GAS, LIQUID AND/OR HEAT BETWEEN FLUIDS

[75] Inventors: Jorge Inacio, Solna; Erling Nilsson, Upplands Väsby, both of Sweden

[73] Assignee: Data Promeditech I.N.C. AB, Solna, Sweden

[21] Appl. No.: 249,931

[22] PCT Filed: Apr. 1, 1987

[86] PCT No.: PCT/SE87/00166
§ 371 Date: Sep. 21, 1988
§ 102(e) Date: Sep. 21, 1988

[87] PCT Pub. No.: WO87/06151
PCT Pub. Date: Oct. 22, 1987

[30] Foreign Application Priority Data

Apr. 10, 1986 [SE] Sweden ................ 8601612

[51] Int. Cl.$^4$ .................. B01D 35/18; B01D 13/00
[52] U.S. Cl. .................. 210/184; 210/186; 210/321.78; 210/321.79; 210/321.8; 210/321.89
[58] Field of Search .............. 210/321.78, 321.79, 210/321.8, 321.87, 321.89, 323.2, 456, 500.23, 185, 186, 637, 638, 654, 184

[56] References Cited

U.S. PATENT DOCUMENTS

| | | |
|---|---|---|
| 2,064,511 | 12/1936 | Wells ................ 210/186 |
| 3,528,553 | 9/1970 | Caracciolo ............ 210/321.9 |
| 3,722,695 | 3/1973 | Sargent et al. ........ 210/321.89 |
| 4,075,091 | 2/1978 | Bellhouse ............. 210/637 |
| 4,124,509 | 11/1978 | Ijima et al. .......... 210/321.79 |
| 4,196,075 | 4/1980 | Bentley .............. 210/637 |
| 4,301,013 | 11/1981 | Setti et al. ......... 210/637 |
| 4,440,641 | 4/1984 | Ostertag ............. 210/321.79 |
| 4,668,395 | 5/1987 | Clark ................ 210/321.87 |

FOREIGN PATENT DOCUMENTS

| | | |
|---|---|---|
| 2716585 | 10/1977 | Fed. Rep. of Germany . |
| 8209011 | 12/1982 | France ............... 210/321.79 |
| 650696 | 5/1982 | Switzerland . |
| 2047874A | 12/1980 | United Kingdom ...... 210/321.79 |
| 2077621A | 12/1981 | United Kingdom ...... 210/321.79 |

Primary Examiner—Richard V. Fisher
Assistant Examiner—Cynthia L. Nessler
Attorney, Agent, or Firm—Browdy and Neimark

[57] ABSTRACT

An apparatus for exchanging ions, molecules, gas, liquid, and/or heat between a first fluid and at least one second fluid, particularly when treating blood, includes a rigid vessel (1) having a substantially circular cylindrical center part (1a) and end parts (1b, 1c) connected thereto. Respective end parts inlet (2) at one end of the vessel and to an axially directed first-fluid tubular outlet (3) at the opposite end of the vessel. At least one bundle (4a–d) of hollow fibers is arranged within the vessel (1) and the opposite ends of the bundles are passed sealingly through the wall (5) if the vessel and opened into a respective inlet chamber (6a–d) and outlet chamber (7a–d) for a second fluid outside the vessel wall (5). The bundle is spread substantially uniformly across the flow path of the first fluid through the vessel from the tubular inlet (2) to the tubular outlet (3). Different fiber bundles (4a–d) can be arranged in a similar manner in the vessel (1) but connected to separate inlet and outlet chambers (6a–d; 7a–d) so as to enable the bundles to conduct mutually different fluids and perform different types of exchange.

12 Claims, 2 Drawing Sheets

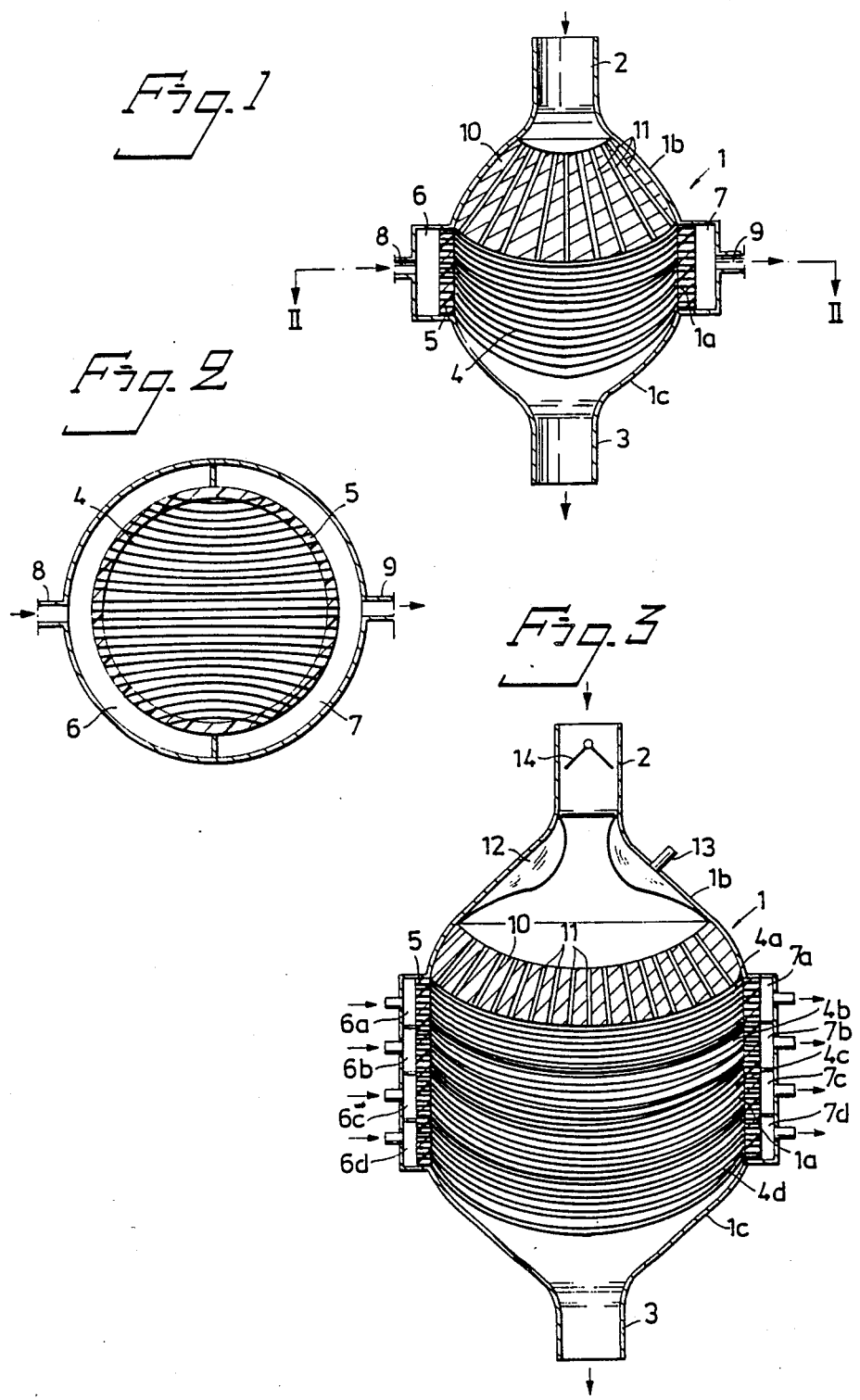

4,917,797

APPARATUS FOR EXCHANGING IONS, MOLECULES, GAS, LIQUID AND/OR HEAT BETWEEN FLUIDS

FIELD OF THE INVENTION

The present invention relates to apparatus for exchanging ions, molecules, gas, liquid and/or heat between fluids, particularly for medicinal or biotechnical use, where at least one of the fluids between which an exchange takes place is a biological fluid, such as blood for example.

BACKGROUND OF THE INVENTION

Exchange functions of this kind are widely used in the field of medicine. An example of such functions is found in blood oxygenators used for supplying oxygen ($O_2$) to and removing carbon dioxide ($CO_2$) from blood in so-called heart-lung machines. Another example is found in so-called dialysis filters for removing liquid and waste salts from the blood in artificial kidneys.

In exchangers of this kind the two fluids between which an exchange is to take place are separated by a membrane which is of a nature such as to enable the exchange desired to be effected therethrough. In the case of one large, principal group of such exchangers, the membrane consists of a very large number of capillary fibres, i.e. hollow fibres, through which one of the fluids passes while the other of said fluids flows around the outer surfaces of the fibres, the walls of the fibres having a nature such as to permit the desired exchange to take place. For example, the fibre walls of a blood oxygenator are permeable to gas, whereas the fibre walls of a dialysis filter are permeable to those salt ions which are to be removed from the blood. For instance, the nature of the fibre wall may be such as to allow liquid to pass therethrough under the influence of a difference in pressure across the fibre wall. The nature of the fibre wall is thus contingent upon or determined by the exchange desired between the two fluids, while the internal diameters of the fibres and the wall thicknesses are contingent on the fluid which is intended to flow through the fibres.

Several important requirements are placed on exchangers which operate with such capillary filter membranes and which are intended for use in medicinal techniques for treating primarily blood.

Thus, the total volume of blood in the apparatus should be the smallest possible;

The passages through or along which the blood travels shall be formed so that no eddy currencies or like turbulence flow will occur and so that no locations are found where blood could stand stationary and coagulate; The flow rate of the fluid which flows around the fibres should be as uniform as possible throughout the entire volume occupied by the fibre bundle.

Hitherto known exchangers provided with capillary fibres do not fulfill all of these requirements in a satisfactory manner.

SUMMARY OF THE INVENTION

The object of the present invention is therefore to provide an improved exchanger of the kind disclosed in the pre-characterizing clause of claim 1.

The characterizing features of the inventive exchanger are set forth in the following claims.

BRIEF DESCRIPTION OF THE DRAWINGS

The invention will now be described in more detail with reference to the accompanying drawings, which illustrate a number of exemplifying embodiments of the invention and in which FIG. 1 is a schematic axial sectional view of a first embodiment of an exchanger constructed in accordance with the invention;

FIG. 2 is a schematic cross-sectional view of the exchanger illustrated in FIG. 1, taken on the line II—II in said Figure;

FIG. 3 is a schematic, axial sectional view of a second second embodiment of the exchanger constructed in accordance with the invention;

DETAILED DESCRIPTION OF THE INVENTION

Figure 4:
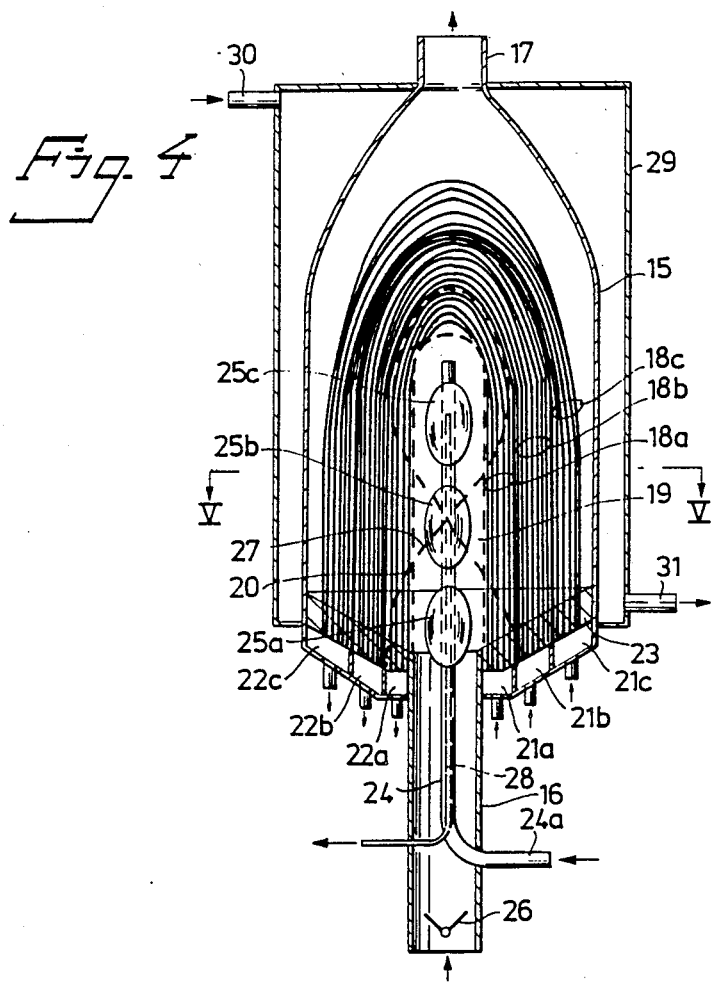
FIG. 4 is a schematic axial sectional view of a third embodiment of an exchanger constructed in accordance with the invention.

The exemplified inventive exchanger illustrated schematically in FIGS. 1 and 2 comprises a rigid container or vessel which is generally referenced 1 in the Figures and which has at one end thereof an axially directed tubular inlet 2 and at its other, opposite end an axially directed tubular outlet 3. The vessel 1 presents between said ends a centrally located part 1a which is essentially of circular-cylindrical configuration and on which there adjoins on one side thereof an inlet portion 1b which tapers gradually inwards from the central region of the vessel towards the tubular inlet and merges therewith. Correspondingly, an outlet portion 1c tapers gradually from the other side of the centrally located part 1a towards the tubular outlet 3c, and merges therewith. The vessel 1 is intended to be throughpassed by one of the fluids between which an exchange is to take place. If the inventive exchanger is to be used to treat blood, the blood is preferably passed directly through the vessel 1.

Extending through the central part 1a of the vessel is a bundle of capillary fibres 4, which are spread substantially uniformly throughout the whole of the throughflow area of the vessel 1, as illustrated schematically in FIG. 2. The two mutually opposite ends of the fibre bundle 4 are passed sealingly through the wall 5 of the central part 1a of the vessel 1, this wall 5 comprising a suitably moulded plastics material which sealingly embraces and firmly holds the respective ends of the hollow fibres or capillary fibres 4. It is, per se, well known to embody the ends of capillary fibre bundles in a plastics matrix in this way, in conjunction with exchangers which utilize capillary fibre membranes. The respective opposite ends of the capillary fibres in the fibre bundle 4 open into an inlet chamber 6 and an outlet chamber 7 for the second fluid, these chambers being located externally of the central part 1a of the vessel 1 and having respectively an inlet 8 and an outlet 9 for the second fluid. The second fluid will therefore flow through the fibres of the fibre bundle 4, while at the same time the first fluid flows around the bundle of fibres in contact therewith.

An advantage is afforded when there is provided in the inlet part 1b of the vessel 1 a rigid body 10, which has arranged therein a large number of throughpassing divergent channels 11 and which covers the whole of the throughflow area of the inlet part 1b and occupies the greater part of the volume thereof. The fluid flowing through the vessel 1 is in this way distributed very effectively over the entire cross-sectional area of the central vessel-part 1a, therewith utilizing the capillary fibres effectively. Because the body 10 takes up a large volumetric part of the inlet part 1b of the vessel, the volume of first fluid present in the exchanger is reduced commensurately, which is highly beneficial when the fluid concerned is blood.

The surface of the body 10 facing the fibre bundle 4 is preferably curved so as to be convex, as illustrated in FIG. 1. This enables the fibres in the fibre bundle 4 to be spread more readily over the whole throughflow area, which is beneficial with regard to the effective use of the fibres, and also ensures that the fibre bundle 4 will take up a significant part of the internal volume of the outlet part 1c of the vessel. This will further reduce the effective vessel volume available to the fluid flowing therethrough, which as before-mentioned is highly beneficial when this fluid is blood.

The exchanger construction illustrated in FIGS. 1 and 2 is generally characterized by a very smooth and uniform flow through the vessel, in the absence of eddy currents or like turbulence and also in the absence of locations where fluid is stationary. Further characteristics reside in highly effective utilization of the bundle of capillary fibres 4 and the very small volume which is available to and need be filled by the fluid flowing through the vessel. All of these features are of extreme benefit when using the inventive exchanger for blood treatment purposes, in which the blood is caused to flow directly through the vessel 1 whereas the second fluid relative to which an exchange or transfer is to take place from the blood flows through the capillary fibres 4, this second fluid being, for instance, a gas used in conjunction with a blood oxygenator or a liquid used in conjunction with a blood dialysis apparatus. There is also afforded in this regard the important advantage that the flow resistance and therewith the drop in pressure of the blood is very much lower than with the known blood treatment apparatus which utilize capillary fibres and with which the blood flows through the narrow capillaries.

The exemplifying embodiment of an inventive exchanger illustrated in FIG. 3 has in all essentials the same basic form as the exchanger illustrated in FIGS. 1 and 2. The characteristics particular to the exchanger of the FIG. 3 embodiment reside primarily in the inclusion of a plurality of capillary fibre bundles 4a, 4b, 4c and 4d, the ends of which are connected to separate inlet chambers 6a, 6b, 6c, 6d and separate outlet chambers 7a, 7b, 7c, 7d. Each of the separate fibre bundles 4a, 4b, 4c, 4d can thus be caused to conduct mutually different fluids in relation to which different types of exchanges shall be effected with the fluid flowing directly through the vessel 1. In this regard, the wall structure and internal diameters of the fibres in respective bundles 4a–4d are, of course, adapted to the exchange function assigned to that fibre bundle through which a designated fluid shall pass. For example, when an exchanger arrangement of this kind is used as a blood oxygenator, one fibre bundle can be used to conduct a fluid effective to remove carbon dioxide from the blood, a second fibre bundle can be used to conduct gas effective to supply oxygen to the blood, and a third fibre bundle can be used to conduct e.g. temperature-controlled water, the fibres of this third bundle having completely sealed or impervious walls so that solely an exchange of heat will take place between the water and blood. In the case of blood oxygenators there is normally a general desire to be able to influence the temperature of the throughpassing blood and to this end known blood oxygenators are used in conjunction with a separate heat exchanger unit. When using an exchanger arrangement of this form for blood dialysis purposes, the fibres of one bundle may be caused to conduct, for instance, a liquid which is effective to produce the desired ion-exchange with the blood, the fibres of a second bundle may be caused to conduct water through the vessel for the purpose of controlling the temperature of the blood, and the fibres of a third fibre bundle may be caused to conduct through the vessel 1 a liquid which has a pressure different to that of the pressure of the blood present in the vessel so as to obtain desired filtration of the blood, i.e. a liquid reduction. It will be understood that many various fibre-bundle combinations and fluids conducted therethrough may be used, depending upon the use for which the exchanger is intended. It will also be understood that the number of fibre bundles incorporated in the exchanger may vary from case to case.

The fibre bundles 4a–4d need not, of course, extend parallel with one another, but can be orientated advantageously so as to extend through the central part 1a of the vessel 1 in mutually different directions. This enables the uniform flow distribution of the fluid passing through the vessel to be further improved. Neither is it necessary for the various fibre bundles to lie in discrete layers, one upon the other, in accordance with the FIG. 3 illustration, but the fibres of, for instance, two mutually different fibre bundles may be intermingled with one another in one and the same layer, in which case the fibres in the two mutually different fibre bundles will conveniently extend through the vessel 1 in mutually different directions, so as to facilitate connection of the various fibres to their assigned inlet chambers 6 and outlet chambers 7 respectively. A further advantage that is possibly afforded by such intermixing of mutually different fibres is that the fibres involved are able to serve as spacers therebetween, thereby enabling the fluid which passes directly through the vessel to flow more readily past the fibres.

The exchanger arrangement of the FIG. 3 embodiment also differs from the embodiment illustrated in FIGS. 1 and 2 in that the flow distributing body 10 of the FIG. 3 embodiment is somewhat smaller and takes up only a part of the vessel inlet part 1b. This enables an elastic, inflatable bladder 12 to be arranged in the inlet part 1b of the vessel.

In the illustrated embodiment, the inflatable bladder has the form of an annulus which encircles the orifice of the tubular inlet 2 and to which a varying gas or liquid pressure can be applied periodically, through a connector 13, so that the bladder 12 can be periodically inflated and deflated. When there is provided, at the same time, a suitably constructed and arranged check valve for preventing back-flow of the fluid flowing directly through the vessel 1, such as the check valve 14, the periodically inflated and deflated bladder 12 will function as a pump which is both simple and effective and which will drive the fluid through the vessel 1 from the tubular inlet 2 to the tubular outlet 3 thereof. Such a pumping facility is highly beneficial, especially when the exchanger is used for blood treatment purposes. The inflatable elastic bladder may, of course, have other forms than that illustrated by way of example in FIG. 3.

A pumping facility for pumping the fluid flowing directly through the vessel 1 can also be obtained by composing one of the fibre bundles from fibres, or extremely finebore tubes, which have impervious or sealed resilient walls and by passing through said fibres, or tubes, a pulsating liquid or gas flow, such as to cause the fibres, or tubes, to expand and contract periodically.

Furthermore, the flow distributing body 10 of the embodiment according to FIG. 1 or 3 may also be hollow, such as to form a chamber through which the channels 11 extend and through which temperature-controlled water can be passed for heat exchange with the fluid flowing through the channels 11.

Figure 5:
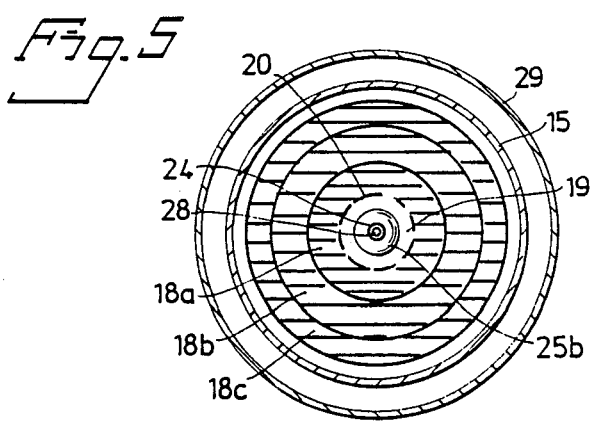
FIG. 5 is a schematic cross-sectional view of the exchanger illustrated in FIG. 4, taken on the line V—V in said Figure.

The exemplifying embodiment illustrated schematically in FIGS. 4 and 5 also incorporates a rigid container or vessel 15, which is connected at one end thereof to an axially directed tubular inlet 16 and at its other, opposite end to an axially directed tubular outlet 17, for one of the fluids between which exchange is to take place. In this embodiment the vessel 15 has arranged therein three different bundles 18a, 18b, 18c of capillary fibres which are positioned so as to surround a centrally located and axially extending space 19 in the interior of the vessel, this space forming an extension of the tubular inlet 16. It is proposed in respect of this embodiment that the fibre bundles 18a-18c are supported by means of a grid or net structure 20 which encircles the space 19 and around which the fibre bundles are spread in a manner to surround the space 19 concentrically therewith, as illustrated schematically in FIG. 5. The ends of respective fibre bundles 18a-18c are drawn through and sealed in the lower, preferably conical end wall 23 of the vessel 15, in a manner similar to that described with reference to FIGS. 1, 2, so that the ends of the fibre bundles open into associated inlet chambers 21a, 21b, 21c and outlet chambers 22a, 22b, 22c located externally of the wall 23. An advantage is afforded when the fibre bundles 18a-18c are laid helically around the central, axial space 19, as illustrated schematically in broken lines 27 in FIG. 4.

It will be seen that the fluid entering through the tubular inlet 16 will pass transversally through the fibre bundles 18a-18c, between respective fibres, in a direction substantially perpendicular to the longitudinal axis of the fibres, whereafter the fluid is collected externally of the outermost fibre bundle 18c and leaves the vessel 15 through the tubular outlet 17. One important advantage afforded by the embodiment illustrated in FIGS. 4 and 5 is that the fibre bundles will have a significant length extension within the vessel 15, therewith enhancing the effectiveness of the exchange function.

In order to ensure that the flow distribution transversally of the fibre bundles 18a-18c is as uniform as possible over the whole length of the fibre bundles, a separate pump arrangement for the fluid flowing through the vessel 15 is located in the central, axial space 19. In the illustrated embodiment this pump arrangement comprises an axial tube 24, which extends up through the central space 19 and carries a plurality of elastic, inflatable bladders 25a, 25b, 25c which surround the axial tube 24 and communicate with the interior thereof. The outer end 24a of the tube 24 is connected to a source of pressurized gas or pressurized liquid, with which the bladders 25a-25c are inflated sequentially, beginning from the bladder 25a, so that the fluid entering through the tubular inlet 16 is pressed past the fibres in the fibre bundles 18a-18c in a direction towards the tubular outlet 17. It is presumed in this respect that a suitable check-valve arrangement 26 is provided for preventing the flow of fluid in the opposite direction. The bladders 25a-25c can thereafter be deflated, by disconnecting the tube 24 from the source of pressurized gas or pressurized liquid and connecting it to an outlet instead. The bladders 25a-25c will, in this way, be deflated sequentially, beginning with the bladder 25a. Alternatively, the bladders 25a-25c can be deflated by interrupting the supply of pressurized gas or pressurized liquid to the tube 24 and opening, at the same time, a narrower ventilating or exhausting tube 28 located coaxially within the tube 24. In this case the bladders 25a-25c will be deflated sequentially with a start from the bladder 25c.

It will be understood that an exchanger embodiment according to FIGS. 4, 5 may also be used with solely one fibre bundle, and also with a plurality of fibre bundles, the nature and use of which can be adapted to the prevailing requirement, in a similar manner to that described with reference to FIG. 3. Thus, one of the fibre bundles incorporated in the exchanger illustrated in FIGS. 4, 5 can be used for heat exchanging purposes with the fluid flowing through the vessel 15, or for pumping this fluid through the vessel.

If so desired the temperature of the fluid flowing through the vessel 15 can be controlled by arranging an outer jacket 29 around the vessel 15, as illustrated in FIGS. 4, 5, this jacket being provided with an inlet 30 and an outlet 31, so as to allow a temperature-controlled liquid to flow through the space defined between the vessel and jacket so as to effect an exchange of heat with the fluid located within the vessel 15 through the wall of said vessel.

Although it has been assumed in the aforegoing that when using one of the aforedescribed embodiments of an inventive exchanger for treating blood that the blood is passed through the rigid container and thus flows between the capillary fibres, it will be understood that there is nothing to prevent the blood from being conducted through one of the fibre bundles when using an exchanger constructed in accordance with the invention. In this case, however, the resistance to flow will be greater and therewith a greater pressure drop in the blood flow.

It will be seen in other respects that many mutually different embodiments of and modifications to an exchanger constructed in accordance with the invention are conceivable within the scope of the invention.

We claim:

1. An apparatus for exchanging ions, molecules, gas, liquid, and/or heat between a blood fluid and at least one other fluid, comprising:
   a rigid vessel having
      a tubular inlet and a tubular outlet for said blood fluid, said tubular inlet and outlet being mutually axially aligned and located at opposite ends of the vessel,
      a substantially cylindrical center portion,
      an inlet portion adjoining said center portion and said tubular inlet and tapering gradually from the center portion to the tubular inlet, and
      an outer portion adjoining said center portion and said tubular outlet and tapering gradually from said center portion to said tubular outlet;
   at least one bundle of substantially parallel hollow fibers extending through said center portion of said vessel so as to be substantially uniformly distributed ver the whole of a cross-sectional area of the flow path of said blood fluid between said inlet and said outlet and having its opposite ends passed sealingly through the wall of said vessel and open respectively into an inlet chamber means and an outlet chamber means for said other fluid, said inlet chamber means and said outlet chamber means being located externally of and adjoining the vessel wall; and a rigid body arranged within said inlet portion of said vessel and covering the whole cross-sectional area of said inlet portion and occupying a substantial part of the internal volume of said inlet portion, said rigid body comprising a plurality of flow channel means, extending through the rigid body and forming a communication between said tubular inlet and said center portion of said vessel, for distributing said blood fluid substantially uniformly over the cross-sectional area of the center portion of the vessel, the surface of said rigid body facing said center portion of the vessel being convex, and the fibers of said fiber bundle being substantially uniformly distributed over said convex surface of said body and extending in planes substantially parallel with said surface.

2. An apparatus according to claim 1 wherein said convex surface of said body is so curved that said fiber bundle occupies a significant part of the internal volume of said outlet portion of said vessel.

3. An apparatus according to claim 1 wherein the surface of said rigid body facing said tubular inlet is a concave surface, said flow channel means extending through the rigid body being directed substantially perpendicular to said convex and concave surfaces of the rigid body.

4. An apparatus according to claim 1, wherein said rigid body fills the predominant part of said inlet portion of the vessel.

5. An apparatus according to claim 1 comprising a periodically inflatable, elastic bladder, said bladder arranged within said inlet portion of the vessel between said rigid body and said tubular inlet, and check-valve means for preventing said blood fluid from flowing through said vessel in a direction from said tubular outlet to said tubular inlet.

6. An apparatus according to claim 1 comprising an additional chamber means located externally of and around said vessel and being provided with an inlet and an outlet for a liquid intended for effecting an exchange of heat with said blood fluid flowing through the vessel and thereby regulating the temperature of said blood fluid.

7. An apparatus according to claim 1 for exchange between blood fluid and at least one other fluid, said apparatus comprising several additional bundles of substantially parallel hollow fibers, one bundle for each of said other fluids, said fiber bundles extending through said center portion of said vessel and their ends passed sealingly through the vessel wall and connected to mutually separated inlet chamber means and outlet chamber means, respectively, so as to enable said several other fluids to be passed through different fiber bundles.

8. An apparatus according to claim 7 wherein said different fiber bundles are arranged in different mutually adjacent layers.

9. An apparatus according to claim 7 wherein the fibers of said different fiber bundles are intermixed with one another in a common layer within the vessel.

10. An apparatus according to claim 7 wherein the fibers belonging to said different fiber bundles extend in mutually different directions within the vessel.

11. An apparatus according to claim 7 wherein one of said different fiber bundles comprises fiber having an elastic, impervious wall, this fiber bundle being caused to conduct a fluid with pulsating pressure in order to dilate the fibers of this fiber bundle periodically.

12. An apparatus according to claim 7 wherein one of said different fiber bundles comprises fibers having an impervious wall, and this fiber bundle conducts a liquid for heat exchange with and temperature control of said blood fluid flowing through the vessel.

* * * * *

UNITED STATES PATENT AND TRADEMARK OFFICE
CERTIFICATE OF CORRECTION

PATENT NO. : 4,917,797

DATED : April 17, 1990

INVENTOR(S) : INACIO et al.

It is certified that error appears in the above-identified patent and that said Letters Patent is hereby corrected as shown below:

In the ABSTRACT. line 6      After "parts", insert -- taper gradually towards an axially extending first-fluid tubular --

Signed and Sealed this

Tenth Day of November, 1992

Attest:

DOUGLAS B. COMER

Attesting Officer      Acting Commissioner of Patents and Trademarks